United States Patent
Quinn et al.

(10) Patent No.: US 6,540,825 B1
(45) Date of Patent: Apr. 1, 2003

(54) COMPOSITIONS UTILIZING DISPERSANTS

(75) Inventors: Robert E. Quinn, Cleveland, OH (US); James S. Magyar, Bedford, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 08/493,116

(22) Filed: Jun. 21, 1995

Related U.S. Application Data

(63) Continuation of application No. 08/339,576, filed on Nov. 14, 1994, now abandoned, which is a continuation of application No. 08/066,801, filed on May 25, 1993, now abandoned.

(51) Int. Cl.$^7$ .............................. C09C 1/44; C09C 1/48; C08K 5/00
(52) U.S. Cl. .................. 106/476; 106/472; 106/482; 106/499; 106/505
(58) Field of Search ......................... 106/472, 476, 106/499, 505, 482

(56) References Cited

U.S. PATENT DOCUMENTS

| | | | |
|---|---|---|---|
| 2,305,379 A | 12/1942 | Detrick | 106/429 |
| 2,867,540 A | 1/1959 | Harris | 106/476 |
| 3,172,892 A | 3/1965 | Le Suer et al. | 548/546 |
| 3,412,111 A | 11/1968 | Irwin et al. | 549/255 |
| 3,819,386 A | 6/1974 | Higgins et al. | 528/408 |
| 3,950,341 A | 4/1976 | Okamoto et al. | 544/372 |
| 4,071,487 A | 1/1978 | Linden et al. | 524/285 |
| 4,108,889 A | 8/1978 | Connor | 562/8 |
| 4,127,493 A | 11/1978 | Elliott et al. | 252/51.5 |
| 4,167,420 A | 9/1979 | Linden et al. | 106/447 |
| 4,167,421 A | 9/1979 | Linden et al. | 106/447 |
| 4,234,435 A | 11/1980 | Meinhardt et al. | 252/51.5 |
| 4,326,973 A | 4/1982 | Hammond et al. | 252/34 |
| 4,328,041 A | 5/1982 | Wilson | 106/429 |
| 4,447,348 A | 5/1984 | Forsberg | 252/75 |
| 4,448,703 A | 5/1984 | Forsberg | 252/75 |
| 4,481,125 A | 11/1984 | Holgado | 252/75 |
| 4,505,832 A | 3/1985 | Whiteman et al. | 252/42.1 |
| 4,518,435 A | 5/1985 | Stansfield | 106/413 |
| 4,599,114 A | 7/1986 | Atkinson | 106/448 |
| 4,642,330 A | 2/1987 | Quinn | 528/335 |
| 4,741,780 A | 5/1988 | Atkinson | 106/448 |
| 4,752,340 A | 6/1988 | Brand et al. | 106/448 |
| 4,784,784 A | 11/1988 | Dohner | 252/79 |
| 4,857,111 A | 8/1989 | Haubennestel et al. | 106/504 |
| 4,859,247 A | 8/1989 | Foye et al. | 106/505 |
| 4,909,852 A | 3/1990 | Atkinson | 106/448 |
| 5,034,508 A | 7/1991 | Nishizaki et al. | 528/408 |
| 5,190,583 A * | 3/1993 | Menzel et al. | 106/482 |
| 5,342,563 A * | 8/1994 | Quinn et al. | 264/681 |

FOREIGN PATENT DOCUMENTS

| | | |
|---|---|---|
| EP | 0628612 B1 | 12/1994 |
| JP | 58-142949 | 8/1983 |

OTHER PUBLICATIONS

South African Patent Application No. 92/8999, Jul. 28, 1993.
European Search Report for corresponding EP Application EP 0628612A3 (Dec. 1994).
Abstract, JP 58–142949 Aug. 1983.

* cited by examiner

Primary Examiner—Elizabeth D. Wood
(74) Attorney, Agent, or Firm—Joseph P. Fischer; Samuel B. Laferty; Michael F. Esposito

(57) ABSTRACT

The present invention describes the reaction product of an alkanolamine and a hydrocarbyl succinic anhydride compound useful in assisting the dispersion of pigments in aqueous and/or non-aqueous media.

14 Claims, No Drawings

COMPOSITIONS UTILIZING DISPERSANTS

This is a continuation of application(s) Ser. No. 08/339,576 filed on Nov. 14, 1994, abandoned, which is a continuation of Ser. No. 08/066,801, filed May 25, 1993, abandoned.

BACKGROUND OF THE INVENTION

1. Field of the Invention

The present invention deals with preparing compositions as dispersions for use in aqueous and non-aqueous media.

2. Description of the Art

It is known that dispersions comprising a non-polar organic liquid, an alkaline earth metal salt of a fatty acid or substituted fatty acid, and a dispersant effective as a rheology modifier for imparting plastic flow to printing inks may be obtained. The foregoing disclosure is found in U.S. Pat. No. 3,819,386 issued Jun. 25, 1974 to Higgins et al. The Higgins et al patent further describes the dispersant as being characterized by having at least one acyl, acyloxy or acylimidoyl group wherein the dispersant is typically derived from a carboxylic acid having at least about 50 carbon atoms and at least one radical containing a nitrogen or oxygen atom connecting the acid-derived group to a hydrocarbon or substituted hydrocarbon radical.

Quinn, in U.S. Pat. No. 4,642,330 issued Feb. 10, 1987 describes dispersant salt compositions made by reacting a phosphorous-free carboxylic solubilizer with sulfonic acid-free organic acids or mineral acids. The carboxylic solubilizer is described as being made by the reaction of a polycarboxylic acid acylating agent having at least one hydrocarbon-based substituent of at least 8 to 500 carbon atoms with at least one poly(alkyleneamine). The dispersant salts have good thermal stability when mixed with a surfactant or hydrophilic organic solvent. The compositions are stated to be useful with aqueous solutions to disperse various fillers including carbon black, as well as to solubilize various fluids.

Forsberg, in U.S. Pat. No. 4,448,703 issued May 15, 1984 describes combinations of carboxylic solubilizers made by reacting an acylating agent with an N-(hydroxyl-substituted hydrocarbyl) amine and surfactants which are useful in incorporating oil-soluble, water-insoluble functional additives into aqueous systems. In particular, the Forsberg patent describes formulating into compositions anti-wear, extreme pressure and load-carrying agents such as dithiophosphates into a water-based hydraulic fluid.

U.S. Pat. No. 5,034,508 issued Jul. 28, 1991 to Shiga et al describes dispersants for non-aqueous systems and particular materials which can disperse insoluble fine powders in non-aqueous liquids in a short period of time and give long-term dispersions stability. The Shiga patent describes avoiding the formation of a so-called hard cake. The dispersant of Shiga consists essentially of a polyether compound derived from the class consisting of polyamine compounds having 5 to 300 active hydrogen atoms per molecule, polyalkylenimine compounds again having the same description of active hydrogen atoms, and derivatives thereof made by the addition of at least one ethylene or propylene oxide and at least one alpha-olefin oxide containing 4 to 30 carbon atoms. A variety of pigments and carbon black are discussed in the Shiga patent.

Similar disclosures to those found in the U.S. Pat. No. 4,448,703 are found in Forsberg's related U.S. Pat. No. 4,447,348 issued May 8, 1984.

Le Suer et al in U.S. Pat. No. 3,172,892 issued Mar. 9, 1965 describes various lubricating compositions for internal combustion engines. The Le Suer patent, in particular describes the reaction of substituted succinic acid or an anhydride with various amine containing compounds. The Le Suer '892 patent also discusses the reaction of a succinic group with an unsaturated or chlorinated containing compound to obtain substituted succinic structure.

U.S. Pat. No. 4,127,493 to Elliott issued Nov. 28, 1978 describes polyesters suitable for use as lubricant additives which are prepared by reacting a dicarboxylic acid or anhydride having a branched chain alkyl or alkenyl substituent having at least 30 carbon atoms with a second compound having a carbonyl, and amine structure.

U.S. Pat. No. 3,950,341 filed Apr. 13, 1976 to Okamoto et al describes oil-soluble ashless detergent dispersants comprising the reaction product obtained by reacting (a) an alkenyl dibasic acid or its anhydride having at least 40 carbon atoms in the alkenyl group with (b) an alcohol of the hindered type and then reacting the obtained intermediate with (c) an amine or its derivative or analogue. The compounds of Okamoto may also be borated or phosphosulfided.

South African application 92/8999 describes the production of ceramic compositions utilizing the reaction product of an alkanolamine and a hydrocarbyl-substituted carboxylic acylating agent.

U.S. Pat. No. 4,071,487 to Linden et al issued Jan. 31, 1978 describes the water-dispersible salts of water-soluble amines of neutral esters of saturated fatty acids with an ethylene dicarboxylic acid and describes the materials as efficient agents for inhibiting deposition of pigment in pigmented aqueous lacquers. Similar disclosures are found in U.S. Pat. Nos. 4,167,420 and 4,167,421 both issued on Sep. 11, 1979.

U.S. Pat. No. 2,867,540 issued Jan. 6, 1959 to Harris describes increasing the wettability of carbon black. Various amine containing compounds are utilized by Harris to accomplish the wettability of the carbon black. Detrick et al in U.S. Pat. No. 2,305,379 issued Dec. 15, 1942 describes the preparation of phthalocyanine and vat dye pigment powders of improved strength and texture. Ammonium salts are utilized by Detrick et al in the aforementioned patent.

Hammond et al in U.S. Pat. No. 4,326,973 issued Apr. 27, 1992 describes quaternary ammonium succinimide salt compositions. The compositions of Hammond et al are described as being useful in lubricating oil compositions.

Wilson in U.S. Pat. No. 4,328,041 issued May 4, 1982 describes a composition obtained from a comminuted inorganic material and a substituted succinic anhydride compound. The comminuted inorganic materials discussed in the Wilson patent include metals, metal oxides, carbon black, sulfur, calcium carbonate, silica and clay.

U.S. Pat. No. 4,481,125 issued Nov. 6, 1984 to Holgado describes water-based hydraulic fluids comprising a polyether-based thickener, a lubricant modifier, a dispersant, an extreme pressure additive and water. The dispersants are the reaction product of an alkenyl succinic anhydride and a dialkyl alkanolamine. Whiteman in U.S. Pat. No. 4,505,832 issued Mar. 19, 1985 describes polyurea and lithium complex grease compositions with anti-fretting which comprised the reaction product of an alkenyl succinic acid or anhydride containing from 10 to 35 carbon atoms in the alkenyl group, further reacted with an alkanolamine.

Stansfield et al in U.S. Pat. No. 4,518,435 issued May 21, 1985 describes dispersing agents which are the salt of a tertiary amine containing at least one poly(lower alkyleneoxy) chain and an aromatic acid. The compositions of Stansfield et al are stated to be useful in the dispersion of an organic pigment, an organic dye stuff or carbon black in a polar organic solvent. Atkinson in U.S. Pat. No. 4,599,114 issued Jul. 8, 1986 describes the treatment of particulate titanium dioxide and other pigments with a surfactant compound. The surfactants described by Atkinson include the reaction product of a diamine, a carboxylic acid and a fatty acid. U.S. Pat. No. 4,741,780 also to Atkinson and issued May 3, 1988 contains similar disclosures to Atkinson's earlier patent.

Brand et al in U.S. Pat. No. 4,752,340 issued Jun. 21, 1988 describes titanium dioxide pigments characterized by improved gloss developing and disperability properties in surface coating vehicles and reduced tendencies to absorb moisture. The titanium dioxide particles have deposited thereon an amine salt of a polyprotic acid and an alkanolamine. Baker in U.S. Pat. No. 4,776,966 issued Oct. 11, 1988 describes drilling fluid compositions of the invert oil-based type which contain a blocked or graft copolymer and further include a $C_{30-500}$ hydrocarbon chain containing surfactant.

Doner in U.S. Pat. No. 4,784,784 issued Nov. 15, 1988 describes hydraulic fluids containing as dispersants the reaction products of di- or trisuccinic anhydrides with polyethoxylated alcohols to produce polyethoxylated hydrocarbyl polyanhydrides.

Thixotropic formulations described by Haubennestel et al in U.S. Pat. No. 4,857,111 issued Aug. 15, 1989. The compositions of Haubennestel et al include hydroxy functional carboxamide compounds. The compositions of the '111 patent may be utilized to disperse silica. U.S. Pat. No. 4,859,247 issued to Foye et al on Aug. 22, 1989 describe oil soluble viscosity reducing additives made by combining an amine and a polybasic organic acid. It is stated in the '247 patent that the additive increases the proportion of pigment and provides advantages in the manufacture of inks. Atkinson in U.S. Pat. No. 4,909,852 issued Mar. 20, 1990 describes the treatment of titanium dioxide and other pigments with a surfactant compound. This Atkinson patent and disclosure are related to the earlier Atkinson patents.

To the extent that the references cited herein are applicable to the present invention they are herein incorporated by reference. Percentages and ratios given herein are by weight unless otherwise indicated. Ranges and ratios may be combined herein. Temperatures are in degrees Celsius and pressures are in KPa gauge unless otherwise noted.

SUMMARY OF THE INVENTION

The present invention describes a method of dispersing a pigment in an aqueous system by forming a mixture comprising:
(A) the reaction product of a hydrocarbyl substituted succinic acid compound and an alkanolamine of the formula $R^1R^2R^3N$;
(B) the pigment; and,
(C) water in an amount sufficient to disperse the resultant product;
wherein (A), (B) and (C) are mixed for a time sufficient to substantially disperse the pigment in the water wherein $R^1$ is a hydroxyhydrocarbyl group; and $R^2$ and $R^3$ are each independently hydrogen, hydroxyhydrocarbyl or hydrocarbyl.

A further aspect of the present invention is a method of forming a solid mixture containing a dispersant (A) and a pigment (B) comprising obtaining a mixture of:
(A) the reaction product of a hydrocarbyl substituted succinic acid compound and an alkanolamine of the formula $R^1R^2R^3N$;
(B) a pigment; and,
(C) water or a solvent in an amount sufficient to disperse the resultant product; and thereafter;
(D) drying the mixture of (A), (B) and (C) to form the solid mixture,
at from about 50° C. to the decomposition of the lowest decomposing member of the mixture provided further that $R^1$ is a hydroxyhydrocarbyl group; and $R^2$ and $R^3$ are each independently hydrogen, hydroxyhydrocarbyl or hydrocarbyl.

The present invention also describes a pellet comprising:
(A) the reaction product of a hydrocarbyl substituted succinic acid compound and an alkanolamine of the formula $R^1R^2R^3N$; and,
(B) a pigment;
wherein $R^1$ is a hydroxyhydrocarbyl group; and $R^2$ and $R^3$ are each independently hydrogen, hydroxyhydrocarbyl or hydrocarbyl.

A further aspect of the present invention is a powdered pigment composition comprising:
(A) the reaction product of a hydrocarbyl substituted succinic acid compound and an alkanolamine of the formula $R^1R^2R^3N$; and,
(B) a pigment;
wherein $R^1$ is a hydroxyhydrocarbyl group; and $R^2$ and $R^3$ are each independently hydrogen, hydroxyhydrocarbyl or hydrocarbyl.

This invention also encompasses a method of dispersing pigment in an organic solvent and or resin by forming a mixture of (A) and (B) wherein:
(A) is the reaction product of a hydrocarbyl substituted succinic acid compound and an alkanolamine of the formula $R^1R^2R^3N$;
(B) is the pigment;
(E) dispersing the (A) and (B) in an organic solvent or resin
wherein $R^1$ is a hydroxyhydrocarbyl group; $R^2$ and $R^3$ are each independently hydrogen, hydroxyhydrocarbyl or hydrocarbyl.

Yet another aspect of the present invention is an organic solvent based composition comprising:
(A) the reaction product of a hydrocarbyl substituted succinic acid compound and an alkanolamine of the formula $R^1R^2R^3N$;
(B) a pigment; and,
(E) an organic solvent or resin
wherein $R^1$ is a hydroxyhydrocarbyl group; $R^2$ and $R^3$ are each independently hydrogen, hydroxyhydrocarbyl or hydrocarbyl.

DETAILED DESCRIPTION OF THE INVENTION

The first component to be discussed in the present invention is component (A) which is the reaction product of a hydrocarbyl substituted succinic acid compound and an alkanolamine of the formula $R^1R^2R^3N$. In the foregoing formula $R^1$ is required to be a hydroxyhydrocarbyl group. $R^2$ and $R^3$ are each independently hydrogen, hydroxyhydrocarbyl or hydrocarbyl. It is first preferred when a hydroxyhydrocarbyl group is defined in the present invention the hydroxyhydrocarbyl group be a hydroxyethyl group, e.g. (2) —$CH_2CH_2OH$. Other useful hydroxyhydrocarbyl groups include hydroxymethyl, hydroxypropyl, and hydroxybutyl groups, e.g.; and (1) $HOCH_2$-; (3) —$CH_2CH(OH)CH_3$ and (4) —$CH_2CH(OH)CH_2CH_3$ and mixtures thereof.

COMPONENT (A) THE ALKANOLAMINE

Generally, the alkanolamines that are useful in the present invention are those described which are reacted with the hydrocarbyl-substituted carboxylic acylating agent, include primary, secondary or tertiary alkanol amines or mixtures thereof. Such alkanolamine can be represented by the formulae:

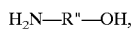

H$_2$N—R"—OH,

(R$_1$)HN—R"OH, and

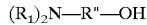

(R$_1$)$_2$N—R"—OH wherein each R$_1$ is independently a hydrocarbyl group of one to about eight carbon atoms or hydroxyhydrocarbyl group of one to about eight carbon atoms, preferably one to about four, and R" is a divalent hydrocarbyl group of about two to about 18 carbon atoms, preferably about two to about four. The group —R"—OH in such formulae represents the hydroxyhydrocarbyl group. R" can be an acyclic or alicyclic group. Typically, R" is an acyclic straight or branched alkylene group such as an ethylene, 1,2-propylene, 1,2-butylene, 1,2-octadecylene, etc., group. Where two R$_1$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R$_1$ is independently a methyl, ethyl, propyl, butyl, pentyl or hexyl group. Examples of alkanolamines include mono-, di-, and tri-ethanolamine, diethylethanolamine, ethylethanolamine, butyldiethanolamine, aminobutanol, aminomethylpropanol, aminopropanol, aminomethylpropanediol, aminoethylpropanediol, aminoethylheptanol and aminopentanol.

The alkanolamines may also be an ether N-(hydroxyhydrocarbyl) amine. These are hydroxypoly (hydrocarbyloxy) analogs of the above-described alkanolamines (these analogs also include hydroxyl-substituted oxy-alkylene analogs). Such N-(hydroxyhydrocarbyl) amines can be conveniently prepared by reaction of epoxides with aforedescribed amines and can be represented by the formulae:

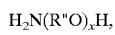

H$_2$N(R"O)$_x$H,

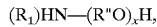

(R$_1$)HN—(R"O)$_x$H, and

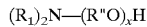

(R$_1$)$_2$N—(R"O)$_x$H wherein x is a number from about 2 to about 15 and R$_1$ and R" are as described above. R$_1$ may also be a hydroxypoly (hydrocarbyloxy) group.

In another embodiment, the alkanolamine may be hydroxy-containing polyamines. Hydroxy-containing polyamine analogs of hydroxy monoamines, particularly hydroxyhydrocarbylated alkylenepolyamines (e.g., N,N (diethanol)ethylene diamine) may also be used. Such polyamines can be made by reacting alkylene polyamines with one or more of the alkylene oxides such as ethylene oxide, propylene oxide, butylene oxide, cyclohexene oxide, and styrene epoxide. Similar alkylene oxide-alkanol amine reaction products can also be used such as the products made by reacting the aforedescribed primary, secondary or tertiary alkanolamines with ethylene, propylene or high epoxides in a 1.1 to 1.2 molar ratio. Reactant ratios and temperatures for carrying out such reactions are known to those skilled in the art.

Specific examples of hydroxyhydrocarbylated alkylenepolyamines include N-(2-hydroxyethyl) ethylenediamine, N,N-bis(2-hydroxyethyl)-ethylene-diamine, 1-(2-hydroxyethyl)piperazine, mono (hydroxypropyl)-substituted tetraethylenepentamine, N-(3-hydroxybutyl)-tetramethylene diamine, etc. Higher homologs obtained by condensation of the above-illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

COMPONENT (A) THE SUBSTITUTED SUCCINIC ACID COMPOUND

The second portion of component (A) is a hydrocarbyl-substituted succinic acid compound.

The hydrocarbyl-substituted carboxylic acylating agent may be a monocarboxylic or polycarboxylic acylating agent provided that when the hydrocarbyl group of the carboxylic acylating agent contains less than an average of 40 carbon atoms, then the carboxylic acylating agent is a polycarboxylic acylating agent. The acylating agents may be a carboxylic acid or derivatives of the carboxylic acid such as the halides, esters, anhydrides, etc. In one embodiment, the carboxylic acylating agent is a succinic acylating agent.

The hydrocarbyl substituted succinic acid is conveniently obtained as a material with a single succinic acid group per hydrocarbyl group. However, it is possible to use in the present invention over-succinated compounds such as those described in U.S. Pat. No. 4,234,435 to Meinhardt et al.

A further preferable description of the present invention is where R$^1$ and R$^2$ are both ethoxy groups. A further aspect of the present invention is where R$^3$ is an ethoxy group. A further preferred aspect of the present invention is where R$^3$ is a lower alkyl group such a methyl, or preferably ethyl when R$^1$ and R$^2$ are ethoxy groups. It is further preferred that the hydrocarbyl group contain from about 14 to 200 carbon atoms.

Yet another variation of the present invention is where the mole ratio and the reaction product of the hydrocarbyl substituted succinic acid compound and the alkanolamine is such that there is 1-half to 1 succinic group per 1 nitrogen from the alkanolamine. It is further preferred in the present invention that at least one of R$^1$, R$^2$ and R$^3$ contain from 1 to about 6 carbon atoms. Preferably R$^2$ and R$^3$ are each independently methyl or ethyl.

The method of reacting the hydrocarbyl substituted succinic acid compound and the alkanolamine is well known and is described in U.S. Pat. No. 4,448,703 issued to Forsberg May 15, 1984.

The hydrocarbyl group of the carboxylic acylating agent generally contains an average of preferably about 10 to about 400, preferably about 12 to about 200 carbon atoms. In one embodiment, the hydrocarbyl group contains an average of about 12, preferably about 20, or about 50 to about 70, preferably about 120 to about 180 carbon atoms. In one embodiment, the hydrocarbyl group is derived from a polyalkene having a number average molecular weight ($\overline{Mn}$) of about 500, preferably about 700, more preferably about 800 to about 5000, preferably about 3000, more preferably about 2000. Number average molecular weight is determined by gel permeation chromatography.

The hydrocarbyl group may be derived from one or more olefins having from about 8, preferably about 10, more preferably about 12, to about 40, preferably to about 30, more preferably to about 24 carbon atoms. These olefins are preferably alpha-olefins sometimes referred to as mono-1-olefins) or isomerized alpha-olefins. Examples of the alpha-olefins include 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, 1-tetracosene, etc. Commercially available alpha-olefin fractions that can be used include the $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{22-28}$ alpha-olefins. etc. The $C_{16}$ and $C_{16-18}$ alpha-olefins are particularly preferred.

Isomerized alpha-olefins are alpha-olefins that have been converted to internal olefins. The isomerized alpha-olefins suitable for use herein are usually in the form of mixtures of internal olefins with some alpha-olefins present. The procedures for isomerizing alpha-olefins are well known to those in the art. Briefly these procedures involve contacting alpha-olefin with a cation exchange resin at a temperature in a range of about 80° to about 130° C. until the desired degree of isomerization is achieved. These procedures are described for example in U.S. Pat. No. 4,108,889 issued to Connor Aug. 22, 1978 which is incorporated herein by reference. The succinic acylating agents are prepared by reacting the above-described olefins or isomerized olefins with unsaturated carboxylic acids such as fumaric acids or maleic acid or anhydride at a temperature of about 160° to about 240° C., preferably about 185° to about 210° C. Free radical inhibitors (e.g., t-butyl catechol) can be used to reduce or prevent the formation of polymeric byproducts. The procedures for preparing the acylating agents are well known to those skilled in the art and have been described for example in U.S. Pat. No. 3,412,111 Irwin et al Nov. 19, 1968; and Ben et al, "The Ene Reaction of Maleic Anhydride With Alkenes", J. C. S. Perkin II (1977, pages 535–537. These references are incorporated by reference for their disclosure of procedures for making the above acylating agents.

In another embodiment, the hydrocarbyl-substituted carboxylic acylating agent may have a hydrocarbyl group derived from a polyalkene. The polyalkenes include polyalkenes containing at least an average of about 50 carbon atoms, preferably at least about 60, more preferably at least about 65 to 500 carbon atoms, preferably to about 300, more preferably to about 200. In one embodiment, the polyalkene is $\overline{Mn}$ (number average molecular weight) value of at least about 1600. Generally, the polyalkene is characterized by an $\overline{Mn}$ value from about 700, preferably from about 800, more preferably from about 900 to about 5000, preferably to about 3000, more preferably to about 2500. In another embodiment, the polyalkene is characterized as having an $\overline{Mn}$ value of about 700, preferably about 800 to about 2000, preferably about 1500.

In another embodiment the hydrocarbyl groups are derived from polyalkenes having an $\overline{Mn}$ value in the above-described ranges and an $\overline{Mw}/\overline{Mn}$ value from about 1.5, preferably from about 1.8, more preferably about 2.5 to about 4, preferably to about 3.6, more preferably to about 3.2. The term $\overline{Mw}$ refers to weight average molecular weight. The preparation and use of substituted succinic acylating agents wherein the substituent is derived from such polyolefins are described in U.S. Pat. No. 4,234,435, the disclosure of which is hereby incorporated by reference.

The polyalkenes include homopolymers and interpolymers of polymerizable olefin monomers of 2 to about 16 carbon atoms, preferably to about 6 carbon atoms. The olefins may be monoolefins such as ethylene, propylene, 1-butene, isobutene, and 1-octene; or a polyolefinic monomer, preferably diolefinic monomer, such 1,3-butadiene and isoprene. Usually the monomers contain from 2 to about 6 carbon atoms, preferably to about 4, more preferably 4. The interpolymers include copolymers, terpolymers, tetrapolymers and the like. Preferably, the polyalkene polymer is a homopolymer. An example of a preferred polymer is a polybutene, preferably a polybutene in which about 50% of the polymer is derived from isobutylene. The polyalkenes are prepared by conventional procedures.

The hydrocarbyl-substituted acylating agents may be prepared by reacting a polyalkene or an olefin with the unsaturated carboxylic reactant such that there is at least one mole of unsaturated reactant for each mole of polyalkene or olefin. Preferably, an excess of unsaturated carboxylic reactant is used. This excess is generally between about 5% to about 25%.

In another embodiment, the acylating agents are prepared by reacting the above described polyalkene with an excess of maleic anhydride to provide hydrocarbyl-substituted succinic acylating agents wherein the number of succinic groups for each equivalent weight of substituent group is at least 1.3. The maximum number generally will not exceed 4.5. A suitable range is from about 1.4 to about 3.5 and more specifically from about 1.4 to about 2.5 succinic groups per equivalent weight of substituent groups. In this embodiment, the polyalkene preferably has an $\overline{Mn}$ from about 1400 to about 5000 and an $\overline{Mw}/\overline{Mn}$ of at least 1.5, as described above. A more preferred range for $\overline{Mn}$ is from about 1500 to about 2800, and a most preferred range of $\overline{Mn}$ values if from about 1500 to about 2400.

The conditions, i.e., temperature, agitation, solvents, and the like, for reacting an unsaturated carboxylic reactant with a polyalkene, are known to those in the art. Examples of patents describing various procedures for preparing useful acylating agents include U.S. Pat. Nos. 3,215,707 (Rense); 3,219,666 (Norman et al); 3,231,587 (Rense); 3,912,764 (Palmer); 4,110,349 (Cohen); and 4,234,435 (Meinhardt et al); and U.K. 1,440,219. The disclosure these patents are hereby incorporated by reference.

COMPONENT (B) THE PIGMENT

The second component of the present invention is denominated as component (B). Component (B) is a pigment. Various pigments may be utilized in the present invention. The pigments may be organic or inorganic with a preference for carbon black.

The pigments may include such materials as organic fine powders, which include colorant powders, such as insoluble azo pigments, azo disperse dyes, anthraquinone disperse dyes, indanthrene dyes, phthalocyanine pigments, lake pigments, perylene pigments, dioxazine pigments, quinacridone pigments, and carbon black.

Among them, as pigments, there may be inorganic pigments, such as titanium dioxide, red and yellow iron oxides, barium sulfate, aluminum hydroxide, calcium carbonate, talc, clay, silica, lead chromate, zinc chromate, strontium chromate, carbon black, cadmium yellow, cadmium red, bloom red, black iron oxide, zinc white, Prussian blue, ultramarine, etc., as well as organic pigments, such as azo pigments, lakes, toners, phthalocyanine pigments, perylene pigments, perinone pigments, isoindolinone pigments, quinacridone pigments, dioxazine pigments, etc. The term "lakes" as used herein means water-insoluble salts or complexes of organic dyes as precipitated on water-insoluble inorganic carriers, such as alumina, and the term "toners" means water-insoluble or hardly water-soluble calcium, strontium or barium salts or complexes of azo dyes, in particular.

These fine powders should generally have an average particle size (diameter) of not more than 100 millimicrons, preferably about 0.01 to 50 millimicrons. When the fine powder is a pigment, a particle size of not more than 20 millimicrons is generally preferred.

COMPONENT (C) WATER

Component C in the present invention is water. Preferably the water does not contain more than 60 parts per million as calcium hardness. However, in many applications the water may simply be used as available tap water.

COMPONENT (E) SOLVENT OR RESIN

A further compositional aspect of the invention is component (E) an organic solvent or resin. The organic solvent or resin is typically described as materials to allow dispersion of the remainder of the composition. The solvents are materials which are aromatics such as xylene or toluene or may be aliphatic materials such as waxes, oils, mineral spirits or naphtha. Various oxygenated solvents may be utilized such as ketones and in particular methylethyl ketone, methylamyl ketone, ethylene glycol monobutyl ether, ethylene glycol monoethyl ether acetate, ethyl acetate, and various alcohols. The alcohols preferably contain from about 1 to 6 carbon atoms. The use of the term solvents also includes various halogenated materials such as trichloro ethane or chlorinated paraffin.

Various resins which may be utilized are well-known in the art. These additional resins include polyesters, alkyds, acrylics, urethanes and epoxy.

The resins which may be utilized in the present invention include resins such as plastic resins, polyethylene resins, polypropylene, polystyrene resins, urethane resins, polyamide resins, acrylonitrile resins, polyfluorinated resins such as Teflon® resins, melamineisocyanurate resins, phenolic resins such as Bakelite resins, etc., solid paraffins, and polyvinylchloride.

Optional ingredients such as agrochemicals, microbicides, antioxidants, ultraviolet absorbers, flame retardants and so forth.

THE VARIOUS METHODS OF THE PRESENT INVENTION

In its simplest aspect of the present invention component (A) is mixed with component (B) and (C) in an amount sufficient to disperse the mixture. Typically, the temperature at which the mixture of (A), (B) and (C) reached during mixing is from about 5° C. to about 95° C., preferably from about 15° C. to about 85° C.

The weight ratio of component (A) to (B) is from 1:500 to about 1:5, preferably about 1:400 to about 1:4, more preferably from about 1:250 to about 1:2.

The weight ratio of the water component (C) to component (B) is conveniently at from about 20:1 to about 1:2, preferably about 8:1 to about 1:1, more preferably from about 7:1 to about 1:1.

A further aspect of practicing the present invention is to obtain a solid mixture containing the dispersant (A) and the pigment (B) comprising mixing components (A), (B) and (C) as previously described and drying the resultant mixture at from about 50° C. to the decomposition temperature of the lowest decomposing member of the mixture. Conveniently, the drying is conducted at a temperature of from about 60° C. to about 250° C. If desired the drying may be accomplished under conditions of reduced pressure. The drying may also be facilitated by tumbling the product or extruding the product following cake drying.

The present invention further comprises pellets of product comprising (A) and (B). Typically, the pellet is formed by spraying the dispersant (A) onto the pigment and compacting the resultant mixture into a pellet.

Water may be utilized as component (C) to facilitate mixing of the components thereby allowing for a more homogeneous distribution of the components within the pellet. The weight ratio of component (C) to component (B) during mixing is as previously described.

The formation of the pellet may also be assisted by drying the mixture prior to formation of the pellet. The pellet formation itself may be accomplished by any of the typical methods in the art to form pellets.

Yet a further variation of the present invention is to obtain a powdered pigment composition comprising essentially components (A) and (B) in the aforementioned ratios. The dried pigment composition may be then be added to an appropriate solvent or water for dispersion and use.

The compositions in the present invention are typically utilized in the printing industry or the paint industry. A particular advantage to the compositions of the present invention and the method of obtaining the composition is that the compositions may be utilized in either aqueous or non-aqueous (solvent based systems). It is also possible to transfer the active ingredients (A) and (B) from an aqueous to a solvent system such as in a flushing operation.

Typically, the weight ratio of the solvent or resin (E) to component (B) is from about 100:1 to about 4:1, preferably 95:1 to about 5:1, more preferably from about 90:1 to about 7:1.

The following are examples of the present invention.

EXAMPLE I

A color concentrate dispersion is made according to the present invention by combining 79 parts of diisononophthlate, 20 parts of a carbon black pigment, and 1 part by weight of an alkanolamine/hydrocarbyl succinic anhydride reaction product. The hydrocarbyl succinic acid reaction product is the alkanolamine is dimethyl ethanolamine and the hydrocarbyl succinic acid has as the hydrocarbyl group a hexadecyl group.

The product is made by charging the components to a bead mill with a zirconium oxide grinding media and grinding the same at 2000 rpm. The product is processed to a 0.5 micron size.

The product so obtained is suitable as a color concentrate for polyvinylchloride.

EXAMPLE II

A pelletized carbon black composition is made of 93.5 parts of carbon black fluff, 6 parts of mineral oil and 0.5 parts of alkanolamine/hydrocarbyl succinic reaction product. The alkanolamine in this example is diethylethanolamine and the hydrocarbyl portion of the succinic anhydride is 1000 molecular weight polyisobutylene.

The product is formed by mixing the mineral oil and the alkanolamine/hydrocarbyl succinic acid reaction product and thereafter adding carbon black fluff to produce the pelletized carbon black.

This product is useful in a printing ink composition.

EXAMPLE III

A composition for paint may be formed by combining 802 parts of the reaction product diethyl ethanolamine and a 1000 molecular weight polyisobutylene substituted succinic anhydride. The foregoing compound is mixed with 2406 parts of distilled water. The water and reaction product are heated to 60° Celsius until emulsification occurs.

The emulsified product is then mixed at 80 parts with 100 parts of carbon black fluff to obtain the pigment composition.

The product is then further processed to remove the water from the system by drying to about 0.4% water in the product. The product obtained is a powder with the dispersant largely coated on the surface of the carbon black.

EXAMPLE IV

One hundred parts of the dried composition of Example III in the undried form are pelletized with a substantial proportion of the water being lost during the pelletization process. The pelletized carbon black is useful for paint and ink compositions. In particular the pelletized form of the product is easy to transport as it has reduced bulk volume and also presents a product which is essentially dust free.

The foregoing product may also be utilized in a color concentrate for plastic such as for polypropylene.

EXAMPLE V

The reaction product of Example III is combined with other components to form a paint composition.

The composition of Example III is utilized at 65 parts and is mixed with 4,790 parts of methylethylbenzene, 27,760 parts of Duramac 2707 (an alkyd paint resin) from McWhorter. There is also present in the formulation 470 parts MPA-1078-X which is anti-settling agent available from NL Industries. The pigment is utilized at 380 parts.

What is claimed is:

1. A method of forming a silica-free carbon black pigment that is dispersible in an organic solvent or resin, the method comprising the steps of:

1. dispersing (A) the reaction product of a hydrocarbyl substituted succinic acid or anhydride with an alkanol amine in (C) water to form an emulsion, said alkanol amine being represented by the formula $R^1R^2R^3N$ wherein $R^1$ is a hydroxyhydrocarbyl group and $R^2$ and $R^3$ are independently hydrogen, hydrocarbyl or hydroxyhydrocarbyl;
   2. mixing the emulsion from (1) with (B) carbon black fluff to obtain a pigment composition;
   3. removing water from said pigment composition to form said carbon black pigment which comprises (A) said reaction product of said hydrocarbyl-substituted succinic acid or anhydride with said alkanol amine deposited on the surface of carbon black pigment.

2. The method of claim 1 with the additional step of dispersing the carbon black pigment formed during step (3) in an organic solvent or resin.

3. The method of claim 1, wherein $R^1$ is $-CH_2CH_2OH$.

4. The method of claim 1 wherein the hydrocarbyl group of the hydrocarbyl substituted succinic acid or anhydride is from about 10 to about 400 carbon atoms.

5. The method of claim 11 wherein the hydrocarbyl substituted succinic acid or anhydride contains a single succinic acid group.

6. The method of claim 1 wherein the weight ratio of component (A) to component (B) during step (2) is from about 1:500 to about 1:5.

7. The method of claim 1 wherein $R^1$ and $R^2$ are each $-CH_2CH_2OH$.

8. The method of claim 1 wherein $R^3$ is $-CH_2CH_2OH$.

9. The method of claim 1 wherein $R^3$ is $C_2H_5-$.

10. The method of claim 1 wherein the hydrocarbyl group on the hydrocarbyl substituted succinic acid or anhydride contains from about 12 to about 200 carbon atoms.

11. The method of claim 1 wherein the mole ratio in the reaction product of the hydrocarbyl substituted succinic acid or anhydride and the alkanolamine of the formula $R^1R^2R^3N$ is one-half to one succinic group per one nitrogen from the alkanol-amine.

12. The method of claim 1 wherein $R^1$, $R^2$, and $R^3$ are selected from the group consisting of: (1) $HOCH_2-$; (2) $-CH_2CH_2OH$; (3) $-CH_2CH(OH)CH_3$ and (4) $-CH_2CH(OH)CH_2CH_3$ and mixtures thereof.

13. The method of claim 1, wherein $R^2$ and $R^3$ are each independently $CH_3-$ or $C_2H_5-$.

14. The method of claim 1 wherein the hydrocarbyl substituted succinic acid or anhydride contains more than one succinic acid or anhydride group.

* * * * *